US012558958B2

(12) United States Patent

Govindarajan et al.

(10) Patent No.: US 12,558,958 B2
(45) Date of Patent: Feb. 24, 2026

(54) VISUAL REPRESENTATION AND CONTROL ENABLED BY REMOTE COMPUTATION AND RENDERING

(71) Applicant: Atieva, Inc., Newark, CA (US)

(72) Inventors: Nikhilesh Govindarajan, Fremont, CA (US); Anand Patil, Fremont, CA (US); Michael Lam, San Jose, CA (US)

(73) Assignee: Atieva, Inc., Newark, CA (US)

( * ) Notice: Subject to any disclaimer, the term of this patent is extended or adjusted under 35 U.S.C. 154(b) by 189 days.

(21) Appl. No.: 18/557,491

(22) PCT Filed: Oct. 30, 2022

(86) PCT No.: PCT/US2022/078952
§ 371 (c)(1),
(2) Date: Oct. 26, 2023

(87) PCT Pub. No.: WO2024/096900
PCT Pub. Date: May 10, 2024

(65) Prior Publication Data
US 2025/0083520 A1     Mar. 13, 2025

(51) Int. Cl.
B60K 35/22          (2024.01)
B60K 35/10          (2024.01)
G06F 3/01           (2006.01)
(52) U.S. Cl.
CPC .............. B60K 35/22 (2024.01); B60K 35/10 (2024.01); G06F 3/017 (2013.01)
(58) Field of Classification Search
CPC ......... B60K 35/22; B60K 35/10; G06F 3/017; G06F 3/04815; G06F 3/04845;
(Continued)

(56) References Cited

U.S. PATENT DOCUMENTS 9,542,004 B1 *   1/2017  Hu ...................... G06F 3/04883
10,656,757 B1 *  5/2020  Smith ..................... G06F 3/013
(Continued)

FOREIGN PATENT DOCUMENTS

WO     2014028232 A1    2/2014
WO     2021050405 A1    3/2021

OTHER PUBLICATIONS

International Search Report and Written Opinion for PCT Application No. PCT/US2022/078952, mailed on Jan. 31, 2023, 9 pages.

*Primary Examiner* — Richard M Camby

(74) *Attorney, Agent, or Firm* — Brake Hughes Bellermann LLP

(57)          ABSTRACT

A system comprises: a sensor configured to detect a gesture relating to a vehicle; a network; an electronic control unit (ECU) coupled to the network, a display device, and the sensor, the ECU providing media functionality for the vehicle, the ECU configured to present a surround view video on the display device, determine a gesture state and screen coordinates for the gesture, and send the gesture state and the screen coordinates over the network; cameras providing feeds; and an ECU coupled to the network and to the cameras, the ECU providing an advanced driver assistance system (ADAS) for the vehicle, the ECU configured to receive the gesture state and the screen coordinates over the network, generate the surround view video based on the feeds of the cameras and the gesture state and the screen coordinates, and send the surround view video over the network.

22 Claims, 4 Drawing Sheets

(58) Field of Classification Search
CPC .... G06F 3/04883; H04N 23/62; H04N 23/63;
H04N 23/661
See application file for complete search history.

(56) References Cited

U.S. PATENT DOCUMENTS

| | | | |
|---|---|---|---|
| 11,256,413 | B2 * | 2/2022 | Tanemura ........... G06F 3/04842 |
| 11,831,982 | B2 * | 11/2023 | Jenkins .................. H04N 5/268 |
| 2010/0062715 | A1 | 3/2010 | Kim et al. |
| 2012/0013539 | A1 * | 1/2012 | Hogan ................ G06F 3/04883 |
| | | | 345/173 |
| 2012/0060177 | A1 * | 3/2012 | Stinson, III ............. G06F 3/012 |
| | | | 725/12 |
| 2016/0019746 | A1 * | 1/2016 | Lyons ................ G06Q 20/3224 |
| | | | 463/31 |
| 2016/0224184 | A1 * | 8/2016 | Nordback ............. G06F 3/0488 |
| 2018/0136802 | A1 * | 5/2018 | Soni ........................ H04L 51/42 |
| 2021/0276425 | A1 | 9/2021 | Gauthier et al. |
| 2022/0118913 | A1 | 4/2022 | Park et al. |

* cited by examiner

VISUAL REPRESENTATION AND CONTROL ENABLED BY REMOTE COMPUTATION AND RENDERING

CROSS REFERENCE TO RELATED APPLICATIONS

This application is a 35 U.S.C. § 371 National Phase Entry Application from PCT Application No. PCT/US2022/078952, filed on Oct. 30, 2022, entitled "VISUAL REPRESENTATION AND CONTROL ENABLED BY REMOTE COMPUTATION AND RENDERING", and designating the U.S., the disclosure of which is incorporated herein in its entirety by reference.

TECHNICAL FIELD

This document relates to visual representation and control enabled by remote computation and rendering.

BACKGROUND

In recent years, more vehicles come equipped with a camera to aid the driving. At first, a single camera was typically mounted at the back of the vehicle and oriented rearward to aid the driver when going in reverse. More recent systems have used multiple cameras and may have been able to generate an artificial view of the vehicle from above. However, such systems may have an inefficient distribution of computational workloads and therefore have little or no scalability.

SUMMARY

In a first aspect, a system comprises: a first sensor configured to detect a first gesture relating to a vehicle; a network; a first electronic control unit (ECU) coupled to the network, a first display device, and the first sensor, the first ECU providing media functionality for the vehicle, the first ECU configured to present a first surround view video on the first display device, determine a first gesture state and first screen coordinates for the gesture, and send the first gesture state and the first screen coordinates over the network; cameras providing feeds; and a second ECU coupled to the network and to the cameras, the second ECU providing an advanced driver assistance system (ADAS) for the vehicle, the second ECU configured to receive the first gesture state and the first screen coordinates over the network, generate the first surround view video based on the feeds of the cameras and the first gesture state and the first screen coordinates, and send the first surround view video over the network.

Implementations can include any or all of the following features. The second ECU is configured to: generate a three-dimensional (3D) model using the feeds; render a two-dimensional (2D) view from the 3D model; and stream the first surround view video based on the 2D view. Generating the 3D model comprises: stitching the feeds into a continuous wrapped-around 2D view; converting the continuous wrapped-around 2D view into a 3D bowl model; and overlaying a 3D model of the vehicle onto the 3D bowl model. The second ECU is configured to encode the 2D view into the first surround view video, and wherein the first ECU is configured to decode the first surround view video before presenting the first surround view video on the first display device. The first ECU provides a front occupant media system of the vehicle, the vehicle further comprising a third ECU providing a rear occupant media system of the vehicle, the third ECU configured to present a second surround view video on a second display device, determine a second gesture state and second screen coordinates for a second gesture detected using a second sensor, and send the second gesture state and the second screen coordinates over the network, wherein the second ECU is further configured to receive the second gesture state and the second screen coordinates over the network, generate the second surround view video based on the feeds of the cameras and the second gesture state and the second screen coordinates, and send the second surround view video over the network. The first ECU comprises a mobile device. The system further comprises a third ECU that comprises a cloud system, wherein the cloud system determines a second gesture state and second screen coordinates for a second gesture detected using a second sensor, and sends the second gesture state and the second screen coordinates over the network, wherein the second ECU is further configured to receive the second gesture state and the second screen coordinates over the network, generate a second surround view video based on the feeds of the cameras and the second gesture state and the second screen coordinates, and send the second surround view video over the network. The first sensor comprises a touchscreen functionality of the first display device. The first sensor comprises an infrared camera. The first gesture state and the first screen coordinates reflect that the first gesture comprises at least one of a rotation, a translation, or a zoom of the first surround view video. The surround view video comprises an H.264 stream. The H.264 stream is based on real-time transport protocol. The H.264 stream is based on user datagram protocol. The system further comprises at least one network switch or gateway that facilitates the sending of the first gesture state and the first screen coordinates by the first ECU, and the sending of the first surround view video by the second ECU. The first gesture state and the first screen coordinates are sent using a transmission control protocol connection. The first gesture state and the first screen coordinates are sent using a real time streaming protocol connection. The network is an Ethernet network or an audio video bridging network.

In a second aspect, a method comprises: presenting a surround view video on a display device using a first electronic control unit (ECU) coupled to a network in a vehicle, the first ECU providing media functionality for the vehicle; determining, using the first ECU, a gesture state and screen coordinates for a gesture detected using a sensor; sending, by the first ECU, the gesture state and the screen coordinates over the network; receiving the gesture state and the screen coordinates by a second ECU coupled to the network and to cameras of the vehicle, the second ECU providing an advanced driver assistance system (ADAS) for the vehicle; generating, by the second ECU, the surround view video based on feeds of the cameras and the gesture state and the screen coordinates; and sending, by the second ECU, the surround view video over the network.

Implementations can include any or all of the following features. The first ECU provides a front occupant media system of the vehicle. The first ECU comprises a mobile device. A third ECU comprises a cloud system, the method further comprising: determining, by the cloud system, a second gesture state and second screen coordinates for a second gesture detected using a second sensor; second, by the cloud system, the second gesture state and the second screen coordinates over the network; receiving, by the second ECU, the second gesture state and the second screen coordinates over the network; generating, by the second ECU, a second surround view video based on the feeds of the cameras and the second gesture state and the second screen coordinates; and sending, by the second ECU, the second surround view video over the network. The method further comprises recording the surround view video.

BRIEF DESCRIPTION OF DRAWINGS

FIG. 2 schematically shows an example of visual representation and control enabled by remote computation and rendering.

Like reference symbols in the various drawings indicate like elements.

DETAILED DESCRIPTION

Figure 1:
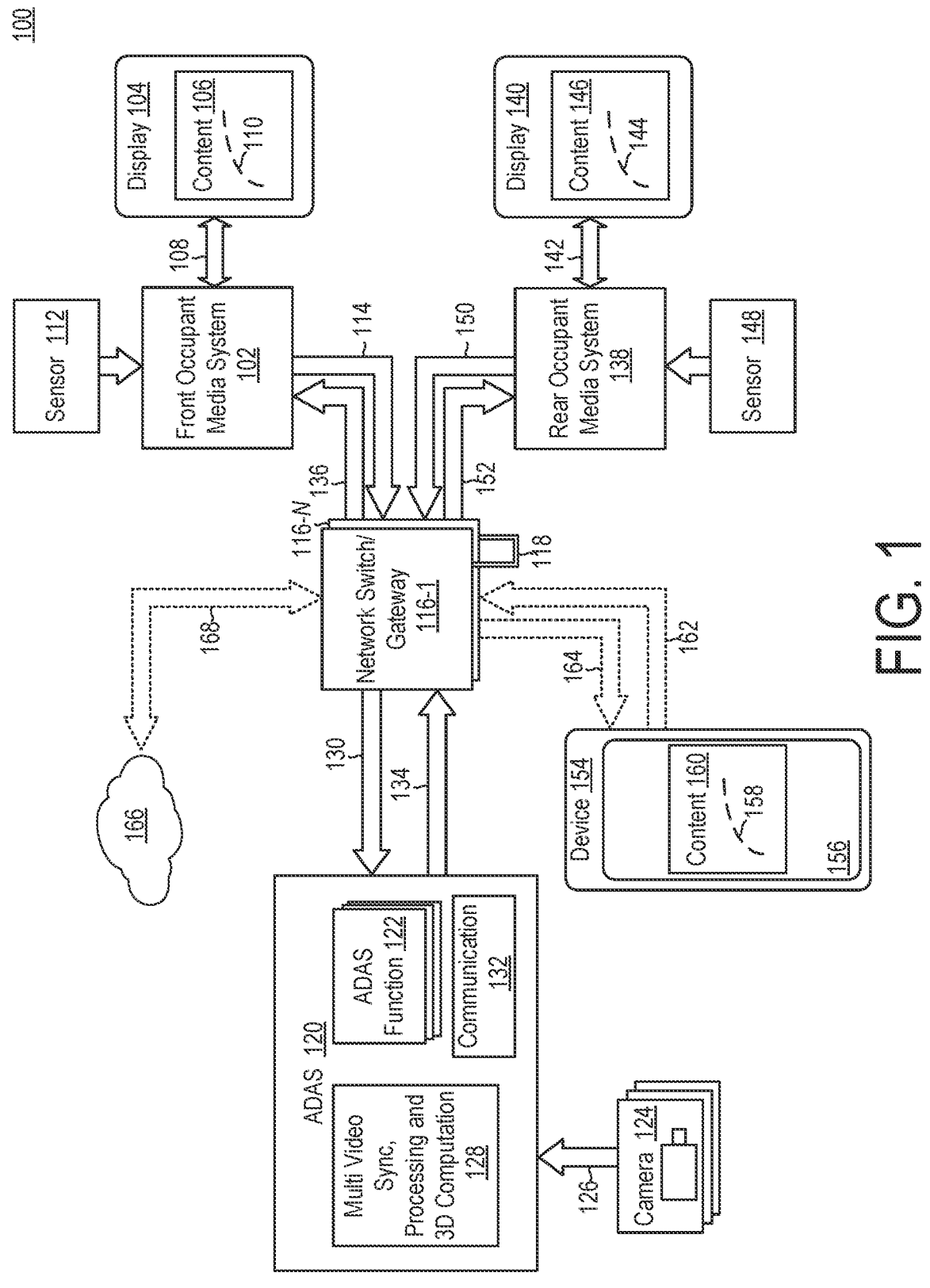
FIG. 1 shows an example of a system that can be implemented with regard to a vehicle to provide visual representation and control enabled by remote computation and rendering.

This document describes examples of systems and techniques providing a visual representation of a vehicle and its surroundings, and control of that visual representation, enabled by remote computation and rendering. A distributed system can be used to perform and implement a surround view monitor with overlayed three-dimensional (3D) rendering provided as a video feed with 3D rendered applications. A surround view monitor system can be provided in a vehicle to present a 360-degree view where a vehicle model is overlayed on surround video, the video being a stitched camera feed view of multiple (e.g., at least front, rear, left and right side outward-facing) cameras of the vehicle. A multiple calibrated video stream sync, processing, and 3D computation workload can be distributed to at least one electronic control unit (ECU), such as an ECU that provides an advanced driver assistance system (ADAS) for the vehicle. For example, such an ECU can perform stitching of camera feeds, and generation and rendering of 3D models. On the other hand, gesture processing logic and view presentation workload can be performed by at least a second ECU, such as a media control unit (e.g., an infotainment system) in the vehicle, or by a cloud-based application remote from the vehicle. For example, this can allow the second ECU to instruct the first ECU what the user (e.g., a vehicle occupant) has requested to see in the surround view monitor. That is, the computing workload regarding generation and control of a surround-view representation can be distributed among at least two ECUs, each having a distinct role and functionality with regard to the vehicle. This can improve scalability and can facilitate implementation of multiple different use cases. In some implementations, the scalability can allow one or more other applications to also be added to the ADAS, the infotainment system, and/or the cloud system, for increased flexibility in the surround view monitoring, while allowing the cameras to be interfaced on only one ECU while many ECUs can make use of the processed surround view video. For example, the placement of such additional application(s) can advantageously be guided by where the computational workload is expected to be relatively low, without needing extra wire harnesses or other hardwiring. The distribution of computing workload can be done in multiple ways, including but not limited to using an Ethernet framework with a backbone of transmission control protocol (TCP) connection, which can optionally also be used for other vehicle functionality. Other approaches can be used.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to an ECU. An ECU is a physical and/or logical unit that performs electronic control of at least one aspect of a vehicle. The ECU can include at least one processor and at least one memory and/or other storage device for instructions (e.g., firmware, and/or other software) to be executed by the processor(s). The ECU can include at least one internal bus and can support at least one interface for communication according to a protocol (e.g., an automotive bus protocol). For example, the ECU can include at least some of the example components described below with reference to FIG. 4. Examples of components or systems that can be controlled by one or more ECUs include, but are not limited to, an engine or other motor (e.g., the inverter of an electric motor); a battery pack or battery modules of an electric vehicle; a thermal system; an ADAS or sensors thereof; or a vehicle infotainment system (e.g., for navigation). For example, an ECU can be designated as a vehicle control unit (e.g., responsible for controlling the powertrain domain). As another example, another ECU can be designated as a vehicle body controller (e.g., responsible for controlling security, access functionality, comfort features, and lights).

Examples herein refer to an ADAS. In some implementations, an ADAS can perform assisted driving and/or autonomous driving. An ADAS can at least partially automate one or more dynamic driving tasks. An ADAS can operate based in part on the output of one or more sensors typically positioned on, under, or within the vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of an ADAS, not every ADAS is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., a light ranging and detection (LiDAR) device); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a thermal sensor; a temperature sensor (e.g., a primary or secondary thermometer); a pressure sensor (e.g., for ambient air or a component of the vehicle); a humidity sensor (e.g., a rain detector); or a seat occupancy sensor.

FIG. 1 shows an example of a system 100 that can be implemented with regard to a vehicle to provide visual representation and control enabled by remote computation and rendering. The system 100 can be used with one or more other examples described elsewhere herein.

The system 100 includes a front occupant media system 102 that provides media functionality for a vehicle. The front occupant media system 102 includes at least one ECU. For example, the front occupant media system 102 can provide, or be part of, an infotainment system of the vehicle. The front occupant media system 102 is coupled to at least one display device 104 of the system 100. The front occupant media system 102 can present content 106 at the display device 104 by way of a connection 108. For example, the content 106 can include surround view video of the vehicle generated according to any example described herein.

The front occupant media system 102 can register a gesture made to control the surround view video. Here, a gesture 110 is schematically represented as the shape of a dashed line positioned relative to the content 106. In some implementations, the display device 104 has touchscreen functionality (e.g., based on capacitive or resistive detection) that detects the gesture performed on the display device 104. The front occupant media system 102 can then register the gesture 110 through the connection 108. In some implementations, the front occupant media system 102 includes a sensor 112 (e.g., an infrared camera) that can detect the gesture 110. The gesture 110 can be performed by an occupant of the vehicle (e.g., a driver or passenger), or by another person (such as in the examples below relating to interfacing with a mobile device or a cloud system.) The front occupant media system 102 can determine a gesture state and screen coordinates corresponding to the gesture 110. For example, the screen coordinates can include normalized touch coordinates for the gesture 110.

The front occupant media system 102 can send the gesture state and screen coordinates as indicated by a stream 114. The stream 114 can enter, or be generated in, a network of the vehicle. In some implementations, the stream 114 is sent using a TCP connection of the system 100. For example, a publisher-subscriber protocol can be used for the TCP connection to add robustness to the communication channel. In some implementations, the stream 114 is sent using a real time streaming protocol (RTSP) connection of the system 100.

The sending of the gesture state and screen coordinates by one ECU (here, the front occupant media system 102) allows another ECU to perform other processing for the surround view video. This enables an advantageous distribution of the workloads for computational tasks in the system 100 with regard to the surround view video. Some vehicles may have a greater number of their ECUs, and therefore more processing power, in one area than in another. Workload distribution can therefore allow a more effective utilization of computing resources, and facilitate a better scalability for increased functionality. Moreover, the distribution of the gesture state and screen coordinates through a network avoids the installation of additional communication harnesses which would significantly increase the vehicle's cost of materials and manufacturing labor, as well as increase its curb weight. As such, the present subject matter can provide flexibility to move task execution and functionality freely around the vehicle, avoiding the concentration of any function on any individual ECU.

The stream 114 can be sent to a network switch/gateway 116-1. The system can include N number of network switches/gateways, N=1, 2, . . . , of which network switches/gateways 116-1 and 116-N are shown. The network switches/gateways 116-1 through 116-N can be coupled to each other by a wired or wireless connection 118 and operate based on one or more processors, and can function as a gateway using a combination of software and hardware. For example, one or more of the network switches/gateways 116-1 through 116-N can be an ECU of the vehicle, or vice versa. One or more of the network switches/gateways 116-1 through 116-N can be a switch, or can be a gateway having a switch, to name two examples.

In some implementations, the vehicle's network is an Ethernet network and the network switches/gateways 116-1 through 116-N are Ethernet gateways or Ethernet switches (e.g., arranged in a ring topology). For example, the network switches/gateways 116-1 through 116-N can perform encapsulation and decapsulation of messages, read tags (e.g., of non-Ethernet communications, such as those of a virtual local area network) and label messages with them, and route Ethernet packages. As such, the network switches/gateways 116-1 through 116-N can facilitate communication within the vehicle and/or with external systems. Other approaches can be used. For example, the system 100 can include an audio video bridging network.

The system can include an ADAS 120 for the vehicle. The ADAS 120 can be configured for performing any of ADAS functions 122. The ADAS 120 can make use of sensor output from one or more sensors for performing its tasks, including but not limited to from a suite of cameras 124 that each provides a feed 126 of video to the ADAS 120. As will be exemplified below, the ADAS 120 can use the video feeds in performing distributed computational tasks relating to surround view video, and also for other purposes. The ADAS 120 can calibrate each of the cameras 124 and/or otherwise control the feeds 126.

The ADAS 120 can be implemented based on a range of physical and/or logical components. Examples include, but are not limited to: a perception component that receives sensor data and performs segmentation; object detection, classification and tracking; vehicle localization; sensor fusion; motion planning; prediction; trajectory construction; and vehicle actuation (e.g., by steering, gear selection, acceleration, and/or braking). Other functionalities can be used additionally or alternatively. A surround view video can be provided for a parking assist feature of the ADAS 120, to name just one example.

The ADAS 120 can participate in workload distribution in the system 100. In some implementations, the ADAS 120 includes a component 128 for multi video sync, processing and 3D computation. The component 128 can facilitate that the ADAS 120 receives a stream 130 of gesture state and screen coordinates over the network (e.g., based on the stream 114 generated by the front occupant media system 102); generates a surround view video based on the feeds 126 of the cameras 124 and on the received gesture state and screen coordinates; and sends the surround view video over the network.

Such network communication to and from the ADAS 120 can be performed using a communication component 132 (e.g., an interface to one or more of the network switches/gateways 116-1 through 116-N). The surround view video can be sent in a stream 134 that may have different characteristics than the streams 114 or 130. In some implementations, the stream 134 is an H.264 stream. The H.264 stream can be based on real-time transport protocol (RTP). For example, this can facilitate error concealment if there is packet loss. The H.264 stream can be based on user datagram protocol (UDP).

The front occupant media system 102 can receive a stream 136 (e.g., based on the stream 134 from the ADAS 120) and present the surround view video as the content 106 on the display device 104. For example, this can involve decoding the stream 136 (e.g., an H.264 stream).

The approaches described herein can provide advantageous scalability regarding surround view video. In some implementations, the vehicle of the system 100 can include a rear occupant media system 138. For example, the rear occupant media system 138 can be coupled to a display device 140 by a connection 142, the display device 140 designated for a subsequent row of seats in the vehicle (e.g., a second or third row). The system 100 can allow generation and control of surround view video using the rear occupant media system 138 in a similar fashion to that of the front occupant media system 102. The rear occupant media system 138 can register a gesture 144 generated relative to content 146. The gesture 144 can be detected using touchscreen functionality of the display device 140 and/or a sensor 148 (e.g., an infrared camera). The rear occupant media system 138 can determine a gesture state and screen coordinates corresponding to the gesture 144 and send them as a stream 150 to the network. After processing by the ADAS 120, a stream 152 of the surround view video can be received by the rear occupant media system 138. That is, the rear occupant media system 138 illustrates another example of one ECU in the system 100 distributing computational tasks to another ECU (e.g., to the ADAS 120).

In some implementations, the system 100 can include a mobile device 154. In some implementations, the mobile device 154 can be a smartphone, tablet, or smart watch or other wearable device. For example, the mobile device 154 is used by an owner of the vehicle or another person to watch, and interact with, the surround view video for the vehicle. The mobile device 154 has a display device 156 where a gesture 158 is generated relative to content 160. The gesture 158 can be detected using touchscreen functionality of the display device 156 and/or a sensor such as an infrared camera. The mobile device 154 can determine a gesture state and screen coordinates corresponding to the gesture 158 and send them as a stream 162 to the network. For example, the stream 162 is generated using wireless transmission devices. After processing by the ADAS 120, a stream 164 of the surround view video (e.g., by a wireless signal) can be received by the mobile device 154. That is, the mobile device 154 illustrates another example of one ECU in the system 100 distributing computational tasks to another ECU (e.g., to the ADAS 120).

In some implementations, the system 100 can include a cloud system 166. In some implementations, the cloud system 166 can include one or more processor-based devices or systems remote to the vehicle of the system 100. The cloud system 166 can control the application that provides the surround view video. As such, the cloud system 166 can determine a gesture state and screen coordinates corresponding to a gesture and send them as part of a stream 168 (e.g., an at least partially wireless communication) to the network of the system 100. After processing by the ADAS 120, the surround view video can be received by the cloud system 166 as part of the stream 168. This can allow the cloud system 166 to control and/or record the surround view video. That is, the cloud system 166 illustrates another example of one ECU in the system 100 distributing computational tasks to another ECU (e.g., to the ADAS 120).

The surround view video can be used for one or more purposes. In some implementations, the system 100 can facilitate recording of the surround view. For example, this can allow an occupant to capture a scenic view during a drive or when the vehicle is stopped. The command to start or stop the recording, or other recording control operations, can be generated by gesture along the lines of other examples described herein. As such, recording can be initiated by any of the front occupant media system 102, the rear occupant media system 138, the mobile device 154, and/or the cloud system 166. The recorded media can be stored in at least one component of the system 100.

In some implementations, at least one of the cameras 124 can be in the cabin of the vehicle. The camera 124 can capture an image of one or more occupants. This image can be merged or otherwise joined with the surround view video. For example, this can allow an image of the occupant(s) to appear with the imagery of a surrounding environment of the vehicle, such as a scenic view.

Figure 2:
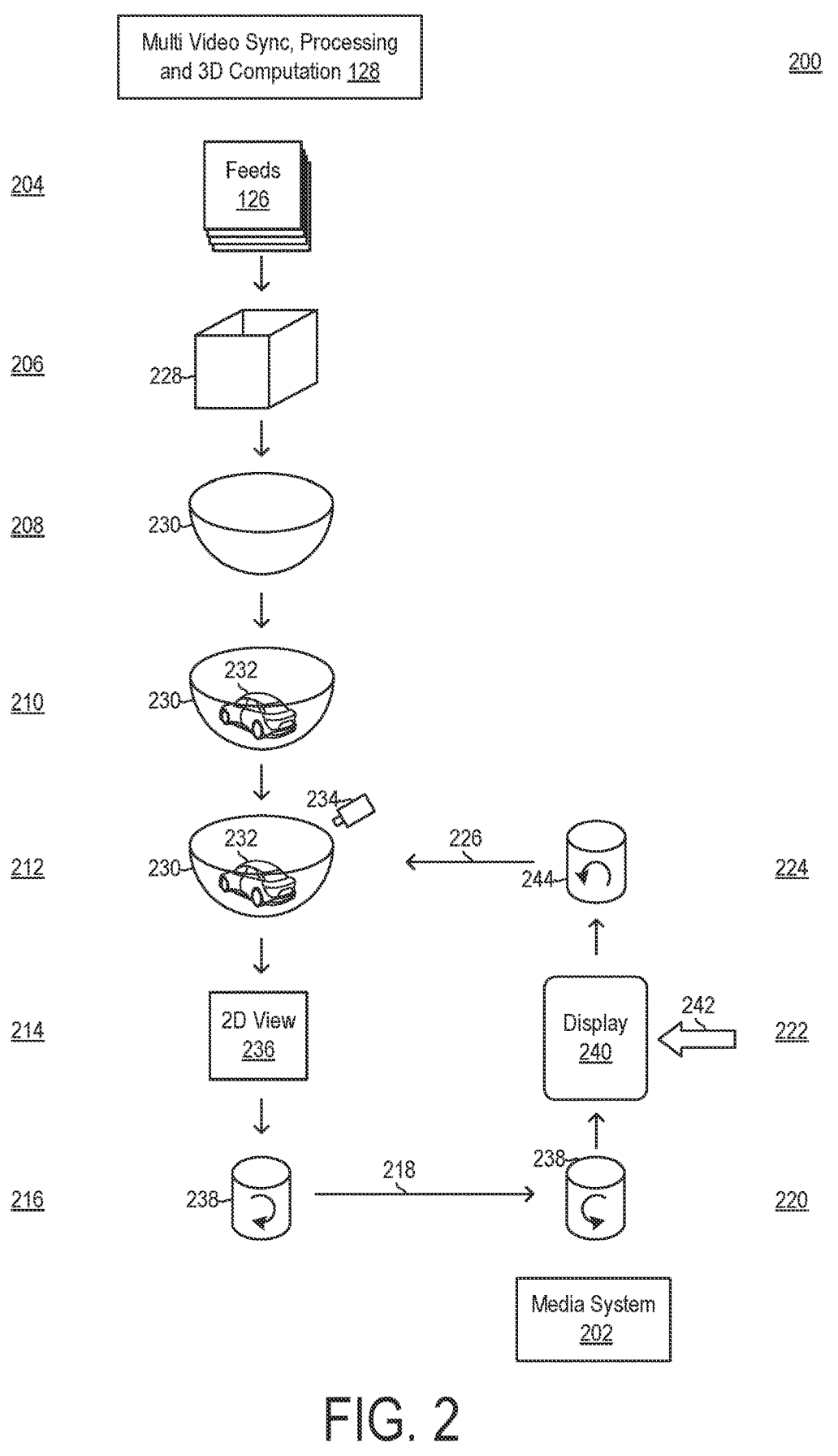

FIG. 2 schematically shows an example 200 of visual representation and control enabled by remote computation and rendering. The example 200 can be used with one or more other examples described elsewhere herein. The example 200 involves the component 128 performing operations that are conceptually illustrated on a left side of the example 200, and a media system 202 performing operations that are conceptually illustrated on a right side of the example 200. For example, the media system 202 can include the front occupant media system 102, the rear occupant media system 138, the mobile device 154, and/or the cloud system 166 of FIG. 1. The example 200 includes multiple operations, here exemplified as operations 204-226.

Operations 204-218 can be performed by the component 128. In operation 204, the component 128 can interface with the feeds 126 of the vehicle cameras. In some implementations, this involves front, rear, left and right side views. For example, one or more of the feeds 126 can be a fisheye camera feed.

In operation 206, the component 128 can stitch the feeds 126 into a continuous wrapped-around two-dimensional (2D) view 228. Generating the continuous wrapped-around 2D view 228 involves determining where the contents of the individual ones of the feeds 126 meet each other so that continuity is ensured. For example, the continuous wrapped-around 2D view 228 can include four 2D views arranged in orthogonal directions in a rectangular shape.

In operation 208, the component 128 can convert the continuous wrapped-around 2D view 228 into a 3D bowl model 230. For example, this involves mapping and/or interpolation of the content of the continuous wrapped-around 2D view 228 into a non-orthogonal geometry.

In operation 210, the component 128 can overlay a 3D model 232 of the vehicle onto the 3D bowl model 230. For example, the 3D model 232 can be placed in the center of the 3D bowl model 230.

In operation 212, the component 128 can control a virtual viewpoint 234 of the 3D bowl model 230 and the 3D model 232 according to the gesture state and screen coordinates received from the other ECU (e.g., from the media system 202). That is, the virtual viewpoint 234 determines the particular view to be calculated from the 3D arrangement at any given time.

In operation 214, the component 128 can render a 2D view 236 of the 3D bowl model 230 and the 3D model 232 according to the virtual viewpoint 234.

In operation 216, the component 128 can encode the 2D view 236 according to a code 238. In some implementations, the 2D view 236 can be encoded in H.264 format. For example, encoding can reduce the required bandwidth of the network compared to a non-encoded transmission.

In operation 218, the component 128 can send the (optionally encoded) 2D view 236 through a network. For example, the 2D view 236 can be sent in H.264 format over Ethernet based on RTP or UDP.

Operations 220-226 can be performed by the media system 202. In the operation 220, the media system 202 can decode the 2D view 236 according to the code 238. For example, the 2D view 236 can be decoded from H.264 format.

In the operation 222, the media system 202 can present the surround view video on a display device 240. The media system 202 can detect a gesture performed with regard to the surround view video, as schematically illustrated by an arrow 242.

In the operation 224, the media system 202 can execute gesture computation logic 244 on the detected gesture to determine a gesture state and screen coordinates. For example, the touch event(s) of the gesture can be evaluated.

In the operation 226, the media system 202 can send the gesture state and screen coordinates over a network. For example, TCP or RTSP connection can be used. This allows the component 128 to base its rendering of the 2D view 236 on the gesture state and screen coordinates so as to produce the requested surround view video.

Figure 3B:
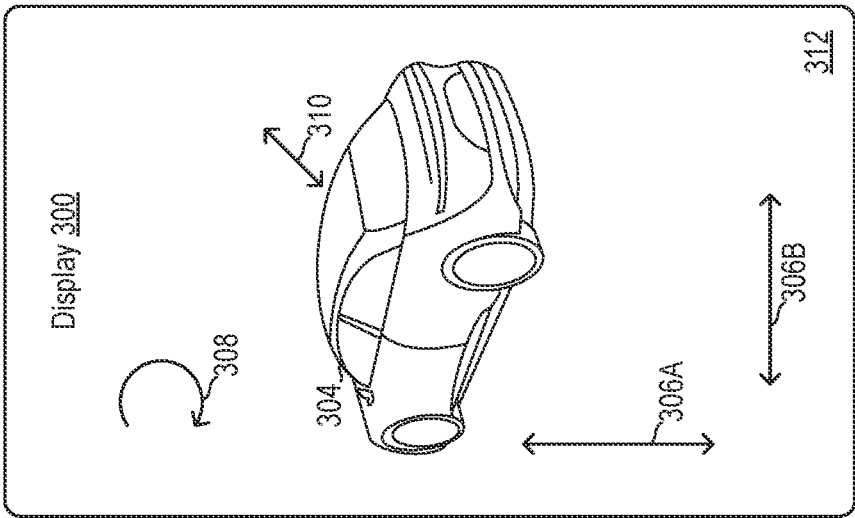
FIGS. 3A-3B show examples of view manipulations that can be controlled by gesture.
Figure 3A:
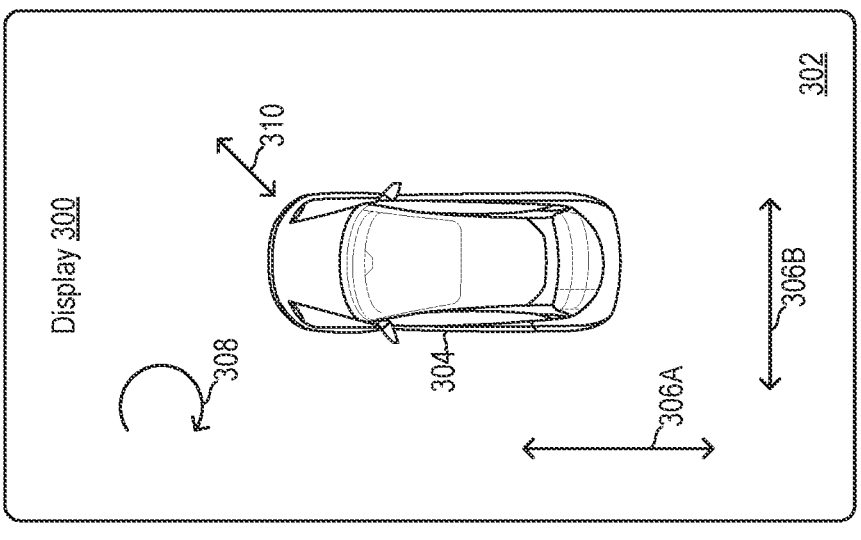

FIGS. 3A-3B show examples of view manipulations that can be controlled by gesture. The examples are described with reference to a display device 300 and can be used with one or more other examples described elsewhere herein. For example, the display device 300 can be any or all of the display device 240 (FIG. 2) or the display devices 104, 140, or 156 (FIG. 1).

In FIG. 3A, a view 302 is presented on the display device 300. The view 302 shows a 3D model 304 of a vehicle. The 3D model 304 is currently shown in a top view (i.e., from above) as part of a surround view video that shows the vehicle and its surroundings. A user can perform one or more gestures to control the surround view video. Gestures can include, but are not limited to, panning, double tapping, pinching, or swiping. Arrows 306A and 306B schematically illustrate that the view 302 can be translated by gesture. For example, the user can move the 3D model 304 and the surroundings linearly by performing a first gesture. An arrow 308 schematically illustrates that the view 302 can be rotated by gesture. In some implementations, the user can rotate the 3D model 304 and the surroundings by performing a second gesture. In some implementations, the 3D model 304 can remain in the top view after the rotation, or the 3D model can be rotated out of the top view and into a different view (e.g., a perspective view). For example, the rotation can be user-specified or a preset rotation. An arrow 310 schematically illustrates that the view 302 can be zoomed by gesture. In some implementations, the user can zoom the 3D model 304 and the surroundings (e.g., making them larger or smaller) by performing a third gesture.

In FIG. 3B, a view 312 is presented on the display device 300. The view 312 shows the 3D model 304 of the vehicle in a perspective view as part of a surround view video that shows the vehicle and its surroundings. A user can perform one or more gestures to control the surround view video. The arrows 306A and 306B schematically illustrate that the view 312 can be translated by the first gesture. The arrow 308 schematically illustrates that the view 312 can be rotated by the second gesture. For example, the 3D model 304 and the surroundings can remain in the perspective view after rotation, or can be rotated out of the perspective view and into a different view. The arrow 310 schematically illustrates that the view 312 can be zoomed by the third gesture.

Figure 4:
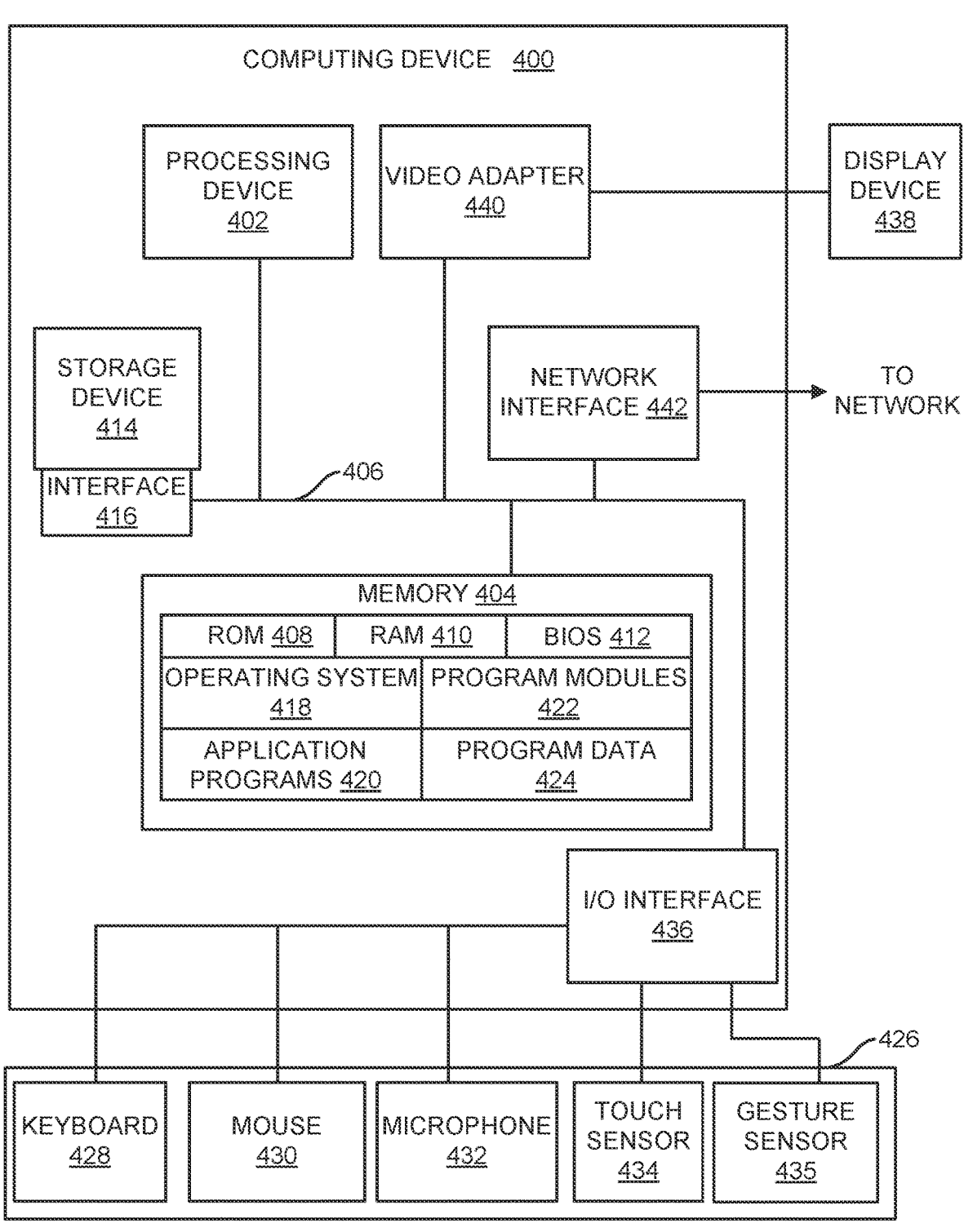
FIG. 4 illustrates an example architecture of a computing device that can be used to implement aspects of the present disclosure.

FIG. 4 illustrates an example architecture of a computing device 400 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 4 can be used to execute the operating system, application programs, and/or software modules (including the software engines) described herein.

The computing device 400 includes, in some embodiments, at least one processing device 402 (e.g., a processor), such as a central processing unit (CPU). A variety of processing devices are available from a variety of manufacturers, for example, Intel or Advanced Micro Devices. In this example, the computing device 400 also includes a system memory 404, and a system bus 406 that couples various system components including the system memory 404 to the processing device 402. The system bus 406 is one of any number of types of bus structures that can be used, including, but not limited to, a memory bus, or memory controller; a peripheral bus; and a local bus using any of a variety of bus architectures.

Examples of computing devices that can be implemented using the computing device 400 include a desktop computer, a laptop computer, a tablet computer, a mobile computing device (such as a smart phone, a touchpad mobile digital device, or other mobile devices), or other devices configured to process digital instructions.

The system memory 404 includes read only memory 408 and random access memory 410. A basic input/output system 412 containing the basic routines that act to transfer information within computing device 400, such as during start up, can be stored in the read only memory 408.

The computing device 400 also includes a storage device 414 in some embodiments, such as a hard disk drive, for storing digital data. The storage device 414 is connected to the system bus 406 by a storage interface 416. The storage device 414 and its associated computer readable media provide nonvolatile and non-transitory storage of computer readable instructions (including application programs and program modules), data structures, and other data for the computing device 400.

Although the example environment described herein employs a hard disk drive as a storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in storage device 414 and/or system memory 404, including an operating system 418, one or more application programs 420, other program modules 422 (such as the software engines described herein), and program data 424. The computing device 400 can utilize any suitable operating system.

In some embodiments, a user provides inputs to the computing device 400 through one or more input devices 426. Examples of input devices 426 include a keyboard 428, mouse 430, microphone 432 (e.g., for voice and/or other audio input), touch sensor 434 (such as a touchpad or touch sensitive display), and gesture sensor 435 (e.g., for gestural input). In some implementations, the input device(s) 426 provide detection based on presence, proximity, and/or motion. Other embodiments include other input devices 426. The input devices can be connected to the processing device 402 through an input/output interface 436 that is coupled to the system bus 406. These input devices 426 can be connected by any number of input/output interfaces, such as a parallel port, serial port, game port, or a universal serial bus. Wireless communication between input devices 426 and the input/output interface 436 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 438, such as a monitor, liquid crystal display device, light-emitting diode display device, projector, or touch sensitive display device, is also connected to the system bus 406 via an interface, such as a video adapter 440. In addition to the display device 438, the computing device 400 can include various other peripheral devices (not shown), such as speakers or a printer.

The computing device 400 can be connected to one or more networks through a network interface 442. The network interface 442 can provide for wired and/or wireless communication. In some implementations, the network interface 442 can include one or more antennas for transmitting and/or receiving wireless signals. When used in a local area networking environment or a wide area networking environment (such as the Internet), the network interface 442 can include an Ethernet interface. Other possible embodiments use other communication devices. For example, some embodiments of the computing device 400 include a modem for communicating across the network.

The computing device 400 can include at least some form of computer readable media. Computer readable media includes any available media that can be accessed by the computing device 400. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 400.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 400 can be characterized as an ADAS computer. For example, the computing device 400 can include one or more components sometimes used for processing tasks that occur in the field of artificial intelligence (AI). The computing device 400 then includes sufficient proceeding power and necessary support architecture for the demands of ADAS or AI in general. For example, the processing device 402 can include a multicore architecture. As another example, the computing device 400 can include one or more co-processors in addition to, or as part of, the processing device 402. In some implementations, at least one hardware accelerator can be coupled to the system bus 406. For example, a graphics processing unit can be used. In some implementations, the computing device 400 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system comprising:
a first sensor configured to detect a first gesture relating to a vehicle;
a network;
a first electronic control unit (ECU) coupled to the network, a first display device, and the first sensor, the first ECU providing media functionality for the vehicle, the first ECU configured to present a first surround view video on the first display device, determine a first gesture state and first screen coordinates for the gesture, and send the first gesture state and the first screen coordinates over the network;
cameras providing feeds; and
a second ECU coupled to the network and to the cameras, the second ECU providing an advanced driver assistance system (ADAS) for the vehicle, the second ECU configured to receive the first gesture state and the first screen coordinates over the network, generate the first surround view video based on the feeds of the cameras and the first gesture state and the first screen coordinates, and send the first surround view video over the network.

2. The system of claim 1, wherein the second ECU is configured to:
generate a three-dimensional (3D) model using the feeds;

render a two-dimensional (2D) view from the 3D model; and
stream the first surround view video based on the 2D view.

3. The system of claim 2, wherein generating the 3D model comprises:
stitching the feeds into a continuous wrapped-around 2D view;
converting the continuous wrapped-around 2D view into a 3D bowl model; and
overlaying a 3D model of the vehicle onto the 3D bowl model.

4. The system of claim 2, wherein the second ECU is configured to encode the 2D view into the first surround view video, and wherein the first ECU is configured to decode the first surround view video before presenting the first surround view video on the first display device.

5. The system of claim 1, wherein the first ECU provides a front occupant media system of the vehicle, the vehicle further comprising a third ECU providing a rear occupant media system of the vehicle, the third ECU configured to present a second surround view video on a second display device, determine a second gesture state and second screen coordinates for a second gesture detected using a second sensor, and send the second gesture state and the second screen coordinates over the network, wherein the second ECU is further configured to receive the second gesture state and the second screen coordinates over the network, generate the second surround view video based on the feeds of the cameras and the second gesture state and the second screen coordinates, and send the second surround view video over the network.

6. The system of claim 1, wherein the first ECU comprises a mobile device.

7. The system of claim 1, further comprising a third ECU that comprises a cloud system, wherein the cloud system determines a second gesture state and second screen coordinates for a second gesture detected using a second sensor, and sends the second gesture state and the second screen coordinates over the network, wherein the second ECU is further configured to receive the second gesture state and the second screen coordinates over the network, generate a second surround view video based on the feeds of the cameras and the second gesture state and the second screen coordinates, and send the second surround view video over the network.

8. The system of claim 1, wherein the first sensor comprises a touchscreen functionality of the first display device.

9. The system of claim 1, wherein the first sensor comprises an infrared camera.

10. The system of claim 1, wherein the first gesture state and the first screen coordinates reflect that the first gesture comprises at least one of a rotation, a translation, or a zoom of the first surround view video.

11. The system of claim 1, wherein the surround view video comprises an H.264 stream.

12. The system of claim 11, wherein the H.264 stream is based on real-time transport protocol.

13. The system of claim 11, wherein the H.264 stream is based on user datagram protocol.

14. The system of claim 1, further comprising at least one network switch or gateway that facilitates the sending of the first gesture state and the first screen coordinates by the first ECU, and the sending of the first surround view video by the second ECU.

15. The system of claim 1, wherein the first gesture state and the first screen coordinates are sent using a transmission control protocol connection.

16. The system of claim 1, wherein the first gesture state and the first screen coordinates are sent using a real time streaming protocol connection.

17. The system of claim 1, wherein the network is an Ethernet network or an audio video bridging network.

18. A method comprising:

presenting a surround view video on a display device using a first electronic control unit (ECU) coupled to a network in a vehicle, the first ECU providing media functionality for the vehicle;

determining, using the first ECU, a gesture state and screen coordinates for a gesture detected using a sensor;

sending, by the first ECU, the gesture state and the screen coordinates over the network;

receiving the gesture state and the screen coordinates by a second ECU coupled to the network and to cameras of the vehicle, the second ECU providing an advanced driver assistance system (ADAS) for the vehicle;

generating, by the second ECU, the surround view video based on feeds of the cameras and the gesture state and the screen coordinates; and sending, by the second ECU, the surround view video over the network.

19. The method of claim 18, wherein the first ECU provides a front occupant media system of the vehicle.

20. The method of claim 18, wherein the first ECU comprises a mobile device.

21. The method of claim 18, wherein a third ECU comprises a cloud system, the method further comprising:

determining, by the cloud system, a second gesture state and second screen coordinates for a second gesture detected using a second sensor;

second, by the cloud system, the second gesture state and the second screen coordinates over the network;

receiving, by the second ECU, the second gesture state and the second screen coordinates over the network;

generating, by the second ECU, a second surround view video based on the feeds of the cameras and the second gesture state and the second screen coordinates; and sending, by the second ECU, the second surround view video over the network.

22. The method of claim 18, further comprising recording the surround view video.

\* \* \* \* \*